July 25, 1939.  H. W. ALDEN  2,167,607
BRAKE MECHANISM
Filed Feb. 10, 1939
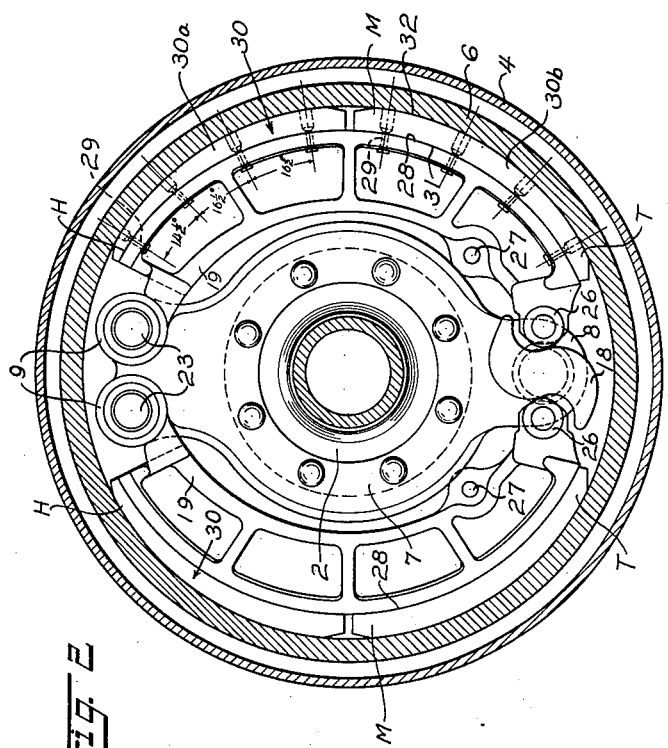
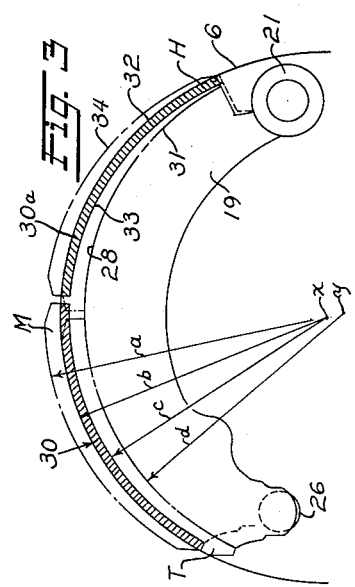
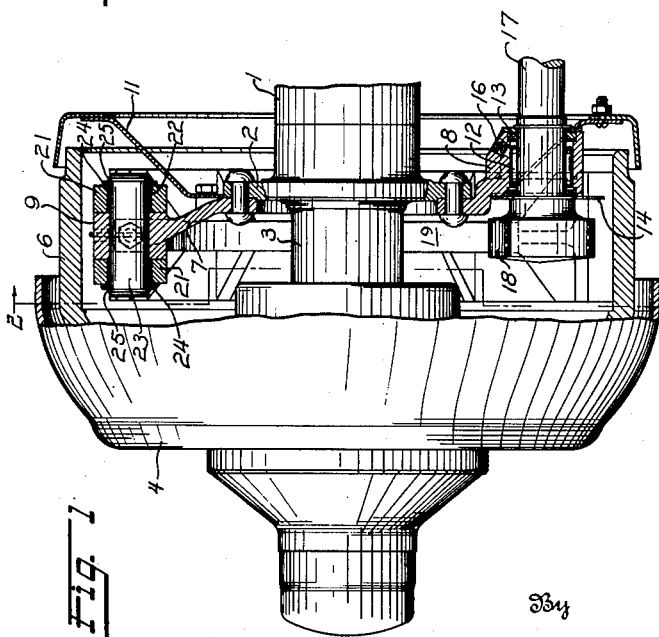
Inventor
Herbert W. Alden
By Strauch & Hoffman
Attorneys Patented July 25, 1939

2,167,607

UNITED STATES PATENT OFFICE 2,167,607

BRAKE MECHANISM

Herbert W. Alden, Detroit, Mich., assignor to The Timken-Detroit Axle Company, Detroit, Mich., a corporation of Ohio Application February 10, 1939, Serial No. 255,772

9 Claims. (Cl. 188—78)

This invention relates to brake mechanisms and particularly to those of the internal-expanding pivoted shoe type.

Brake mechanisms of this kind have pivoted shoes provided with brake linings which, when the shoes are moved outwardly by a suitable means, bear against the internal periphery of a surrounding cylindrical brake drum and exert a braking force thereon. The brake shoes have outer cylindrical surfaces on which the brake linging units or elements, in the form of segments of an annulus, are secured, usually by means of rivets.

With this type of construction, due to the varying rates in which different parts of the cylindrical outer surfaces of the linings approach the cylindrical drum surfaces, as the shoe is pivoted, the linings do not wear out evenly, and the mid-portion of the lining will be worn down to the rivet heads while there is still a considerable amount of lining material remaining above the rivet heads at each of the ends. Accordingly, linings of this type must be discarded long before all of the usable material has been worn away and, therefore, considerable waste of such material results. Furthermore, uneven wear is frequently occasioned by the tilting or cocking of the shoes due to lack of stability in the mounting thereof.

This invention, therefore is primarily concerned with improvements in brake mechanisms of the aforementioned type, and particularly improved shoes and lining elements or units therefor, providing better operation of the mechanism as a whole and more efficient wear of brake linings used therein whereby the linings are entirely and evenly worn out, down to their securing means, throughout their whole extent before it is necessary to replace the same.

Accordingly, it is a primary object of this invention to provide an improved brake mechanism including novel brake shoe and lining construction giving more efficient wear, longer life and requiring less brake lining material initially.

A further object of this invention is to provide an improved brake shoe and lining unit construction which has longer life and permits complete and full wearing out of the brake lining before change thereof becomes necessary.

A still further object of this invention is to provide an improved brake lining, for use with pivoted brake shoes in an internally expanding brake, having a novel shape and adapted to cooperate with a surrounding cylindrical drum to give longer life and more efficient wearing of the brake lining during use thereof.

Another object of this invention is to provide improved brake shoes having novel brake lining supporting surfaces for linings of the type just mentioned and also having spaced supporting means giving increased lateral stability during operation.

A still further object of this invention is to provide novel means for assuring correct assembly of brake shoe linings of the improved type disclosed herein.

The foregoing and other ancillary objects of this invention will become apparent from the following detailed description of a preferred embodiment thereof, when considered in connection with the appended claims and accompanying drawing, wherein:

Figure 1 is a partial sectional view of a portion of a conventional automotive wheel assembly embodying an improved brake mechanism constructed in accordance with the present invention;

Figure 2 is a sectional view of the mechanism shown in Figure 1, taken substantially on the line 2—2 of Figure 1 looking in the direction of the arrows;

Figure 3 is a side view, somewhat diagrammatic, of a brake shoe unit constructed in accordance with the present invention and showing the unit in two operating positions to illustrate the manner in which the brake lining is worn away during use; and Figure 4 is a side view, similar to that of Figure 3, but showing a conventional type of brake shoe unit.

Referring to Figure 1, numeral 1 designates one end of an axle housing having a brake mechanism supporting flange 2 and an extended wheel supporting section 3 on which is rotatably mounted a wheel assembly 4. Wheel assembly 4 includes a cylindrical brake drum 6 in the usual manner. Riveted to flange 2 is a brake shoe supporting plate 7, formed at its lower end to provide a bearing boss 8, and at its upper end with pin supporting bosses 9. A dust shield, or guard, 11 is secured to the back side of brake supporting plate 7 by bolts, in the manner shown.

Anti-friction bearing 12 is received in bearing boss 8 and suitable sealing means 13 and 14 are arranged at each end thereof. Boss 8 is provided with a threaded lubricant-fitting opening 16. Journaled in bearing 12 is a brake operating shaft 17 provided at its inner end with a cam 18 for engaging the end of brake shoes 19.

Brake shoes 19 are formed at their anchor or heel ends with spaced portions 21 in which are fitted bearing sleeves 22, pivoted on supporting pivot pins 23 mounted in the supporting bosses 9 of brake supporting element 7, as shown. The spaced bearings 22 provide increased lateral stability, thus obviating tilting or cocking of the shoes, and assuring that the linings will be worn evenly in a transverse direction. Sealing elements 24—24 are secured against the end faces of the brake shoes at this point and held in place by means of snap rings 25—25 engaged in grooves in the pins 23.

At the opposite cam, or toe, ends brake shoes 19 are provided with cam engaging rollers 26, and a spring, not shown, is secured in spring eyes 27—27, provided in the brake shoes, to hold the shoes and cam engaging rollers 26 against cam 18.

The outer surfaces 28 of the brake shoes are cylindrical in shape, and when in "on position", as later explained, are concentric to drum 6. Secured thereto by rivets 29 are brake lining elements or units 30 formed of suitable friction material. As shown in Figure 2 these brake lining elements are made in two sections 30a and 30b, but, if desired, they may be made as a single piece. However, when the shoe linings are formed of molded material, as is the usual practice, it expedites manufacture to make them in two sections. Also, two-part brake linings are less likely to become distorted under the high temperatures which result from the operation of the brake.

Brake lining elements 30, shown in Figure 2 in their initially engaged positions, are substantially crescent-shaped in longitudinal cross-section and have eccentric inner and outer cylindrical surfaces 31—32. The cross-sectional shape of the linings is really that of an asymmetrical segment of a crescent; as heel portion H is of slightly less radial thickness than toe portion T, while mid-portion M is of greater thickness than either portion H or T.

Turning now to Figures 3 and 4, and especially to Figure 3, wherein the brake shoe 19 is shown merely in outline, the lining, in its original and unworn condition, is represented by the area included between the arcuate lines 31 and 32, it being noted that the line 32 coincides with arcuate line 6 which represents the inner surface of the brake drum. In these views the rivets are omitted to avoid confusion. The area included between the arcuate lines 32 and 33 is the cross-section of the lining in its completely worn condition; that is, worn to the heads of the rivets 29, shown in Figure 2. The area included between the arcuate line 32 and the broken arcuate line 34 indicates the cross-section of that part of the lining which has been worn away during operation of the brake. Thus this figure represents the brake shoe in two positions, first that of initial engagement of the new lining, and second, that of engagement with the brake drum when the lining has been entirely worn.

Lines $a$ and $b$ are radii of the outer surface of the brake lining and lines $c$ and $d$ are the radii of the arcuate surface 28 of the brake shoe in two extreme operating positions.

As the brake shoe pivots radius $d$ moves outwardly to radius $c$ so that the center of curvature $y$ of the shoe surface 28 coincides with the center $x$ of the brake drum when the brake shoe is in the "on-position" and the brake lining is worn down to the rivets 29. Accordingly, this outer surface of the brake shoe is machined so as to be concentric with the drum when the brake shoe is in the "on-position" and the lining is completely worn. Therefore, as my improved lining varies in thickness from end to end in substantially the same manner as the rate of approach thereof to the cylindrical drum surface 6, when the lining has reached its fully "on position" it will be worn out to a remaining uniform thickness throughout its entire length.

Referring now to Figure 4 in which a conventional type of brake shoe and lining unit are shown the several parts of the unit are designated by the same reference characters used in Figure 3, but to distinguish the same these characters are primed. As in Figure 3, the area between arcuate lines 31' and 32' indicates the brake lining, as initially installed, and with the brake in engagement with the brake drum 6'. As will be noted, lining 30' is initially of uniform thickness throughout. The area between arcuate lines 32' and 33' represents the cross-section of the brake lining after the brake has been worn down, in its mid-portion, to a thickness equal to the height of the rivets used to secure it to the brake shoe, while the area included between the line 32' and broken line 34' indicates the cross-section of that part of the brake lining which has been worn away.

In this conventional type of brake shoe the outer surface 28' is machined concentric with the center $x'$ of the drum 6', when the shoe is in the "off-position"; that is, in the position of initial engagement when the lining is new, see radii $c'$—$d'$. In the "on-position" of final wear the common center of radii $c'$—$d'$ are shifted out to point $y'$, and these radii assume the positions of lines $a'$—$b'$.

As will be observed, in the conventional construction illustrated in Figure 4, when the lining has been worn down to the rivet heads in its mid-portion, each end of the lining has a considerable amount of usable material present above the rivet heads. In my improved construction the area included between arcuate lines 32 and 33 is of uniform thickness throughout so that when the lining has been worn down to the rivets in its mid-portion the same condition will exist at each end. Thus with the conventional construction, shown in Figure 4, as the linings must be replaced when they have worn down to the rivets, a very considerable amount of usable material will be wasted, while in my improved construction the lining need not be replaced until it has been fully worn out down to the rivet heads, throughout its entire length. Also, due to the novel shape of my improved linings, considerably less material is initially required.

This results in a considerable savings of brake lining material as well as an increase in mileage between changes of brake lining. Exact values will, of course, vary in different sizes of brake drums and brake shoes. However, a specific example of the increased efficiency of my improved brake mechanism is now given.

In a brake drum, as shown in Figure 3, having an internal diameter of sixteen and one-half inches, one-half inch maximum effective throw of brake shoe, the thickness at point M is three-quarters of an inch, while at the toe end T it is nine-sixteenths, and at the heel end H only seven-sixteenths of an inch in thickness. The original cross-sectional area of a lining of this type, and of the arcuate extent shown, is 11.45 square inches. In the corresponding unit, shown in Figure 4, the lining 30' is three-quarters of an inch thick throughout and its cross-sectional area is 12.46 square inches. When the lining of Figure 3 has been worn down to one-quarter inch, the height of rivets 29, the cross-sectional area removed, between the lines 32 and 34, is 7.12 square inches, while in the brake shoe shown in Figure 4 the amount which has worn away between the lines 32' and 34' is only 6.69 square inches.

In the former, the effective area of 7.12 square inches is 62 per cent of the original area, while in the latter the effective area of 6.69 square inches is only 53.7 per cent of the original area. The actual increase of effective area in my improved unit is six and one-half per cent, and as the life of the lining will be directly proportional to the area worn away this represents a corresponding increase in lining mileage. In addition, not only is the mileage of the brake linings increased by six and one-half per cent, but also the amount of material initially required in the improved lining is very considerably less, being approximately 92 per cent of that required in the conventional construction.

Because of the asymmetric crescent-shape of the linings 30 they must be properly assembled on shoes 19 with the thinner ends adjacent the heel H. To this end the rivets 29 are irregularly spaced about the periphery of the shoe, as shown, with the two rivets, in the heel ends of the shoes, spaced closer together than the others. Thus, when the linings are installed, whether or not they comprise two sections 31—32, as shown, or a single element, it is impossible to assemble the lining unit incorrectly. Also, if the unit has two sections it will not be possible to reverse the position of these two sections during assembly.

From the foregoing, it will be seen that I have provided an improved brake mechanism which is rugged and durable in character, easy to make and also highly efficient in operation, resulting not only in increased mileage between changes of brake lining, but also in economy of material used.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a brake mechanism, a drum member having an internal cylindrical braking surface; a rigid brake shoe within said drum having a curved external surface whose radius of curvature is less than the radius of curvature of the braking surface of said drum; means so pivoting said shoe as to cause the center of curvature of said external surface to move along an arc intersecting the center of said drum; a curved lining unit adapted for frictional cooperation with the braking surface of said drum and having an internal surface conforming exactly to, and supported upon the external surface of said shoe; and means for securing said lining unit to said shoe in full surface engagement therewith, comprising a plurality of circumferentially spaced fastening elements secured to said shoe and each projecting a uniform distance into said lining unit; the outer ends of said fastening elements defining an arc concentric to the external surface of said shoe and having a radius of curvature the same as the radius of curvature of the braking surface of said drum, whereby, when said lining unit wears away the outer ends of said fastening elements will be brought into engagement with said braking surface simultaneously and maximum use made of the lining material.

2. In a brake mechanism, a drum member having an internal cylindrical braking surface; a rigid brake shoe pivoted at one end within said drum and having a curved external surface whose radius of curvature is less than the radius of curvature of the braking surface of said drum; a curved lining unit adapted for frictional cooperation with the braking surface of said drum and having an internal surface conforming exactly to, and supported upon the external surface of said shoe; said lining unit when unworn being considerably thicker at its free end than at its pivoted end; and means for securing said lining unit to said shoe in full surface engagement therewith, comprising a plurality of circumferentially spaced fastening elements secured to said shoe and each projecting a uniform distance into said lining unit; the outer ends of said fastening elements defining an arc concentric to the external surface of said shoe and having a radius of curvature the same as the radius of curvature of the braking surface of said drum, whereby, when said lining unit wears away the outer ends of said fastening elements will be brought into engagement with said braking surface simultaneously and maximum use made of the lining material.

3. In a brake mechanism, a drum member having an internal cylindrical braking surface; a rigid brake shoe pivoted at one end within said drum and having a curved external surface whose radius of curvature is less than the radius of curvature of the braking surface of said drum; a curved lining unit adapted for frictional cooperation with the braking surface of said drum and having an internal surface conforming exactly to, and supported upon the external surface of said shoe; said lining unit, when unworn, being considerably thicker at its free end than at its pivoted end, and means for securing said lining unit to said shoe in full surface engagement therewith, comprising a plurality of circumferentially spaced fastening elements secured to said shoe and each projecting a uniform distance into said lining unit; the outer end of said fastening elements defining an arc concentric to the external surface of said shoe and having a radius of curvature the same as the radius of curvature of the braking surface of said drum, whereby, when said lining unit wears away the outer ends of said fastening elements will be brought into engagement with said braking surface simultaneously and maximum use made of the lining material, said lining unit comprising a pair of individual lining members disposed in circumferentially spaced relationship on said shoe, and said fastening elements passing through openings in said lining members which are spaced apart in one member in a different manner than in the other member, whereby said members cannot be inadvertently interchanged during assembly thereof on said shoe.

4. As a new article of manufacture, a rigid brake lining member for use with a drum having an internal braking surface; said member being curved and having an external radius of curvature equal to the radius of curvature of the particular size drum for which it is designed, and having an internal radius of curvature smaller than the radius of curvature of the braking surface of said drum; said member having a plurality of small apertures opening onto its inner surface and a plurality of large apertures aligning with said small apertures and opening onto the outer surface of said member; each pair of said small and large apertures being adapted to receive a headed fastening element and merging into each other along a shoulder defining a seat for the head of said fastening element, said seats defining a circular arc having a radius of curvature equal to the radius of curvature of the braking surface of said drum, whereby the lining material exterior to said circular arc may be uniformly and entirely worn away before the lining member is unfit for further service.

5. As a new article of manufacture, a rigid brake lining member for use with a drum having an internal braking surface; said member being curved and having an external radius of curvature equal to the radius of curvature of the particular size drum for which it is designed, and having an internal radius of curvature smaller than the radius of curvature of the braking surface of said drum, said member having a plurality of small apertures opening onto its inner surface and a plurality of large apertures aligning with said small apertures and opening onto the outer surface of said member; each pair of said small and large apertures being adapted to receive a headed fastening element and merging into each other along a shoulder defining a seat for the head of said fastening element, said seats defining a circular arc having a radius of curvature equal to the radius of curvature of the braking surface of said drum, said circular arc being concentric with the inner surface of said lining member.

6. As a new article of manufacture, a rigid brake lining member for use with a drum having an internal braking surface, said member being curved and having an external radius of curvature equal to the radius of curvature of the particular size drum for which it is designed, and having an internal radius of curvature smaller than the radius of curvature of the braking surface of said drum; said member having a plurality of shouldered apertures provided therein, said apertures being adapted to receive a headed fastening element, said shoulders facing toward the outer surface of said member and defining seats for the heads of said fastening elements, said shoulders being adapted to locate said fastening elements with their heads along a circular arc having a radius of curvature equal to the radius of curvature of the braking surface of said drum, whereby the lining material exteriorly of said fastening elements may be entirely worn away before the lining member is unfit for further service, one of the ends of said lining member when unworn, being thicker than the other end.

7. As a new article of manufacture, a brake lining unit comprising a pair of lining members adapted to be carried on the outer surface of a single rigid brake shoe and frictionally cooperate with the interior of a brake drum, said lining unit, when the parts thereof are disposed in cooperative relationship, having an external radius of curvature equal to the radius of curvature of the particular size drum for which it is designed, and having an internal radius of curvature smaller than the radius of curvature of said drum, said unit having a plurality of apertures provided therein through which fastening elements may be passed to secure said unit to said brake shoe, one end of said unit being thicker than the other and the apertures in one of said lining members being non-uniformly spaced with respect to the apertures in the other member, so that the said members cannot be inadvertently assembled on said brake shoe in improper relationship.

8. As a new article of manufacture, a brake lining unit comprising a pair of lining members adapted to be carried on the outer surface of a single rigid brake shoe and frictionally cooperate with the interior of a brake drum, said lining unit, when the parts thereof are disposed in cooperative relationship, having an external radius of curvature equal to the radius of curvature of the particular size drum for which it is designed, and having an internal radius of curvature smaller than the radius of curvature of said drum, said unit having a plurality of small apertures opening onto its inner surface and a plurality of larger apertures registering with said small apertures and opening onto the outer surface of said unit, each pair of small and large apertures being adapted to receive a headed fastening element and merging into each other along a shoulder defining a seat for the head of said fastening element, said seats being so spaced with respect to the center of said drum that the lining material may be worn down uniformly to the heads of all of said fastening elements before it is unfit for further service, one end of said unit being thicker than the other and the apertures in one of said lining members being non-uniformly spaced with respect to the apertures in the other member, so that the said members cannot be inadvertently assembled on said brake shoe in improper relationship.

9. As a new article of manufacture, a brake lining unit comprising a pair of lining members adapted to be carried on the outer surface of a single rigid brake shoe and frictionally cooperate with the interior of a brake drum, said lining unit, when the parts thereof are disposed in cooperative relationship, having an external radius of curvature equal to the radius of curvature of the particular size drum for which it is designed, and having an internal radius of curvature smaller than the radius of curvature of said drum, said unit having a plurality of small apertures opening onto its inner surface and a plurality of larger apertures registering with said small apertures and opening onto the outer surface of said unit, each pair of small and large apertures being adapted to receive a headed fastening element and merging into each other along a shoulder defining a seat for the head of said fastening element, said seats defining a circular arc having a radius of curvature equal to the radius of curvature of the braking surface of said drum, whereby the lining material may be worn down uniformly to the heads of all of said fastening elements before it is unfit for further service, one end of said unit being thicker than the other and the apertures in one of said lining members being non-uniformly spaced with respect to the apertures in the other member, so that the said members cannot be inadvertently assembled on said brake shoe in improper relationship.

HERBERT W. ALDEN.